United States Patent [19]
Bednar et al.

[11] Patent Number: 5,204,811
[45] Date of Patent: Apr. 20, 1993

[54] DOCUMENT PROCESSOR WITH TRANSPORT BUFFER

[75] Inventors: Gregory M. Bednar; Thomas A. E. Miller; Paul L. Olson, all of Charlotte; Matthew G. Yenik, Matthews, all of N.C.

[73] Assignee: International Business Machines Corporation, Armonk, N.Y.

[21] Appl. No.: 673,921

[22] Filed: Mar. 25, 1991

[51] Int. Cl.⁵ .............................................. G06F 15/00
[52] U.S. Cl. ..................................................... 364/406
[58] Field of Search ........................................ 364/406

[56] References Cited

U.S. PATENT DOCUMENTS

| | | | |
|---|---|---|---|
| 4,196,846 | 4/1980 | Kao et al. | 235/475 |
| 4,264,808 | 4/1991 | Owens et al. | 235/379 |
| 4,404,649 | 9/1983 | Nunley et al. | 364/900 |
| 4,555,617 | 11/1985 | Brooks et al. | 235/379 |
| 4,733,359 | 3/1988 | Luperti et al. | 364/478 |
| 4,786,789 | 11/1988 | Gaucher | 235/432 |

Primary Examiner—Roy N. Envall, Jr.
Assistant Examiner—Ari M. Bai
Attorney, Agent, or Firm—A. P. Tennent

[57] ABSTRACT

Method and apparatus for processing checks and deposit tickets. The deposit ticket and its corresponding checks are transported through a portion of the apparatus where data representing the monetary amounts displayed on the documents is entered into a computer. The checks are held in a buffer area until all of the checks in the group corresponding to the deposit ticket have had their amounts entered. When the computer indicates that the total of the entered amounts equals the amount on the deposit ticket, the checks are individually withdrawn from the buffer and delivered to an inscriber which encodes or prints monetary data on the checks. By inscribing the checks only after balancing, the need to make corrections to inscribed checks is significantly reduced.

22 Claims, 3 Drawing Sheets

DOCUMENT PROCESSOR WITH TRANSPORT BUFFER

BACKGROUND OF THE INVENTION

1. Field of the Invention

This invention relates, in general, to financial document processors and, more specifically, to apparatus and methods for inscribing data on checks and deposit slips.

2. Description of the Prior Art

Financial transaction documents, such as checks, are often subjected to various types of processing by the bank where the documents are first deposited. In the case of checks, the checks are processed to inscribe the currency amount of the check, and other data, at particular locations on the check and in a particular format. This operation enables the check amounts to be automatically read by reader/sorter equipment as the checks are subsequently sent through the clearing process of the commercial banking network. There are various types of systems and equipment which can perform this type of inscribing operation.

One version of equipment conventionally used for this purpose requires operator feeding of a deposit ticket or check into the apparatus and keying in the amount on the document. The checks are inscribed with the amount as they are keyed in by the operator. If the deposit amount and the total of the inscribed amounts of the checks following the deposit ticket agree, the deposit is considered balanced, or in banking terminology "proved." If the deposit does not balance, this method of check inscribing has the disadvantage that the operator must manually examine the deposit ticket and each item of the deposit to locate and correct the error. The correction is time consuming because a special re-inscribing operation is required to physically change the incorrectly inscribed amounts on the checks. Usually, this requires that a sticker be placed over the incorrectly inscribed data and that the correct data be inscribed on the sticker.

Another type of check processing equipment has been used in the prior art which overcomes some of the disadvantages of the previously described system. This equipment uses an image of the check and deposit ticket to aid in the inscribing and balancing operations. First, the checks are automatically fed through a document processing machine which captures the images of the documents and also reads the codeline data. The codeline data identifies each item and is used by the check system in subsequent processing. The images are stored and used for identifying the check amounts by character recognition or by operator keying from a display. The images can also be used to assist the operator in reconciling any balancing problems. After the deposit is balanced, the operator refeeds the documents through the same, or different, transport to sequentially inscribe the amount values on the documents. This second pass is referred to as the "power encoding" step. This two-pass approach has the disadvantages of requiring additional handling of the documents, which reduces operator productivity, and increasing the occurrence of document sequencing errors.

Since these types of devices present unique problems in productivity and operation, it is considered advantageous to balance and inscribe check deposits without the problems associated with these devices. Therefore, it is desirable, and an object of this invention, to provide a financial document processing system which increases operator productivity and eliminates the need to correct inaccurately inscribed amount values on the documents.

There are several United States patents which relate to this type of apparatus. U.S. Pat. No. 4,196,846, issued on Apr. 8, 1980, is an example of a patent disclosing a document processing system. In this patent, the checks are processed, one at a time, for reading and data encoding. First, the check is read by a magnetic ink character reader (MICR) as the check is transported past a MICR device. Next, the individual check is temporarily stored in a holding station while the transport stops to communicate with the system, transmit all of the read data to the data bank, and obtain the printing data. The transport then reverses its path and steps through the print station where the data is inscribed onto the check. After printing, the transport speeds up in the reverse direction and moves the check with the newly printed data through the read station again where the data is verified prior to diverting the document into a stacker station, or output bin. This patented device differs from the present invention in that the patented device does not process a group of checks for a balance total, does not inscribe the checks after the balance has been proved, and does not contain a holding station or buffer which stores all of the checks in the group being balanced before the inscribing operation. The apparatus disclosed in the U.S. Pat. No. 4,196,846 does not prevent inaccurately inscribed amounts which must be corrected.

SUMMARY OF THE INVENTION

There is disclosed herein a new and useful financial document processing system which eliminates the need to correct inaccurately inscribed amount values on the documents. The documents are first transported through a data entry station where the monetary amounts on the documents are entered, as data, into a computer. The documents are then held in a buffer area until all of the documents in a group have been processed. When the amounts entered properly balance with each other, the documents are individually removed from the buffer and transported to an inscribing station which prints or inscribes the monetary amounts on the documents for machine reading of the amounts in subsequent processing. By inscribing the documents only after an accurate balance has been verified, the need to correct improperly inscribed documents is reduced. Therefore, the use of the buffer, although it temporarily holds the documents which usually means slowing an operation, has the overall advantage of increasing throughput and productivity of a balancing and inscribing operation.

According to a specific embodiment of the invention, the apparatus captures an image of the checks and deposit tickets which are being processed by the apparatus. An operator uses the captured images to enter the monetary amounts displayed on the documents into a data base of a desk top computer system. The documents thus entered are then transported to a holding or storage area where the checks remain until all of the checks corresponding to the deposit ticket are entered and balanced. The checks also pass through various stamping and magnetic ink character readers within the apparatus.

The storage or buffer area, where the checks are held while the balancing operation is being completed, includes separate input and output transport controls and a buffer-full indicator which allow for separate operation of the pre-buffer and post-buffer portions of the apparatus. This permits the data entry and inscribing operations of the apparatus to be performed at different speeds without effectively slowing each other. After the balancing of the checks, the checks are moved to an inscriber where the monetary amounts are inscribed on the checks. Then, the checks are transported to an output stacker which contains several different output bins for sorting the checks.

BRIEF DESCRIPTION OF THE DRAWINGS

Further advantages and uses of this invention will become more apparent when considered in view of the following detailed description and drawings, in which.

DETAILED DESCRIPTION OF PREFERRED EMBODIMENT

Figure 1:
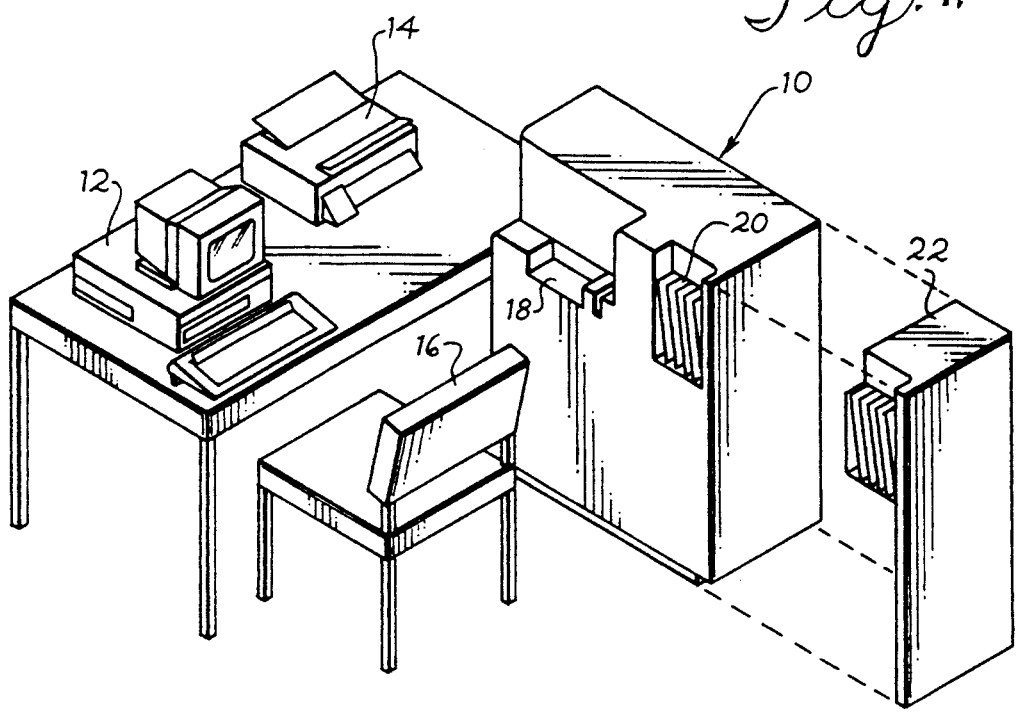
FIG. 1 is an overall view of a document processing system constructed according to this invention.

Throughout the following description, similar reference characters refer to similar elements or members in all of the figures of the drawings.

Referring now to the drawings, and to FIG. 1 in particular, there is shown an overall view of a document processing system constructed according to this invention. The main processing apparatus 10 is used in conjunction with the computer 12 and the printer 14 which are of the type normally associated with desk top computing systems. An operator sitting in chair 16 operates the processing system by inserting a stack of checks into the hopper 18 of the apparatus 10. The checks are fed into and transported through the apparatus 10 where various functions and operations are performed on the checks. These include, but are not limited to, scanning an image of the check for storage in a magnetic memory of the computer 12, recognizing characters displayed on the check, reading magnetic characters already printed on the check, and inscribing data on the checks corresponding to various information and data specific to the particular check. Once the checks have been processed, they are transported to the output stacker 20 which includes several pockets or bins for sorting or collating the checks. The attachment 22 may be connected to the apparatus 10 in cases where additional output pockets are desired for the sorting operation. The computer 12 includes a balancing program which controls the calculations according to a predetermined criteria to accomplish a balancing operation on data obtained from the apparatus 10.

Figure 2:
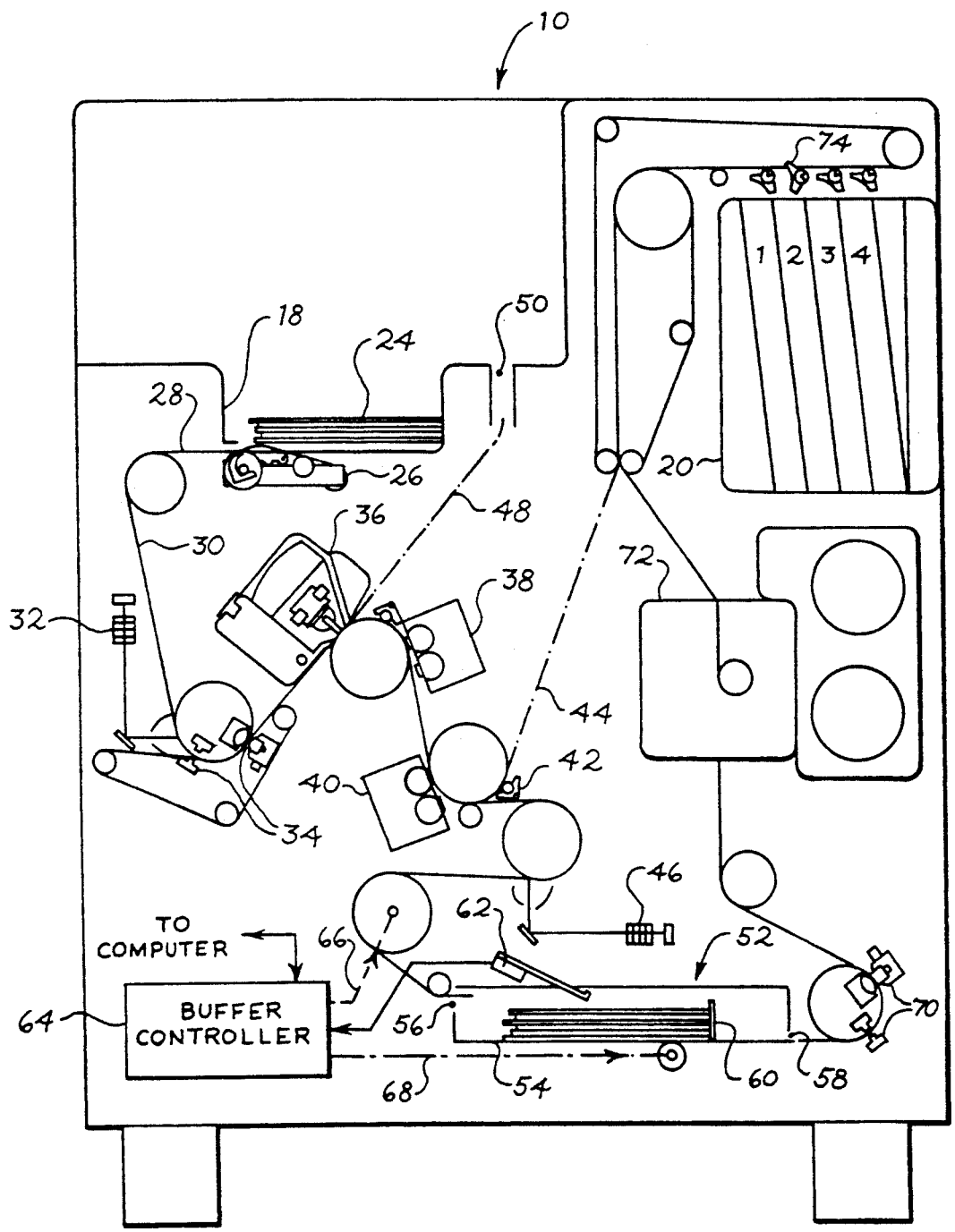
FIG. 2 is a schematic diagram of a document processor constructed according to a specific embodiment of this invention.

FIG. 2 is a schematic diagram of the document processing apparatus 10 shown in FIG. 1. As shown in FIG. 2, the group or stack of documents is placed in the hopper 18 with a face-up orientation. The documents included in the group 24 can be various types of financial documents needed to be processed and sorted by this type of apparatus. In particular, the apparatus is particularly useful for processing deposit tickets and the checks associated with that particular deposit ticket. Normally, it is desirable to process all the checks associated with a particular deposit ticket to confirm the check amounts and to see if the deposit amount appearing on the deposit ticket is accurate. In other words, it is to be determined whether the sum of the amounts on the checks balances with the amount indicated on the deposit ticket. It is not absolutely necessary that the deposit ticket be included in the group of documents 24 since there may not be a need to inscribe anything on the deposit ticket. It is also possible to include the deposit ticket in the group of documents 24, but not inscribe anything thereon by either not activating the inscribing device or by-passing it altogether. In special applications, some of the checks in the group may not need to be inscribed. This can be the situation when some of the checks are drawn on the processing bank, which is referred to as "on-us" items. When the deposit ticket is to be included, the deposit ticket can be either the first or last document in the group, depending upon the manner in which the apparatus is accustomed to seeing the deposit ticket in the group.

Assuming that the documents 24 contain a deposit ticket and several checks, the checks are pulled off of the bottom of the stack by the auto feed mechanism 26 and routed to the next station of the apparatus. Routing can be done by conveyor belts, suitably aligned rollers, or other devices conventionally used for this purpose. The path along which the checks move because of the guiding and transporting system is shown by solid lines in FIG. 2. For example, lines 28 and 30 indicate the path of the checks between the input hopper 18 and the next processing station in the apparatus.

After leaving the hopper 18, the checks pass by the front image scanner 32 which has an appropriate electrical sensor for picking up an image of the front side of the checks. This electronic image is transferred to the associated computer system for storage in a data storage unit of a computer. The image captured by this process can be used later in the processing for various purposes, such as character recognition, operator review of document content, operator guidance in keying-in the currency amounts or monetary amounts on the face of the checks, and operator assistance in resolving out-of-balance deposits.

It is also conceivable that the image captured by the scanner 32 can be used to preserve a permanent record of the processed checks without further filming or copying of the check images.

After being scanned for image capture, the checks move through the front side magnetic ink character reader (MICR) device 34 which is used to read the codeline of magnetic characters already printed on the check, such as the routing number and account number conventionally preprinted on checks. This information is also transferred to the associated computer 12. The sequence number of the check is printed on the back side of the check by the printer station 36 as the check moves out of the MICR device 34. Devices for performing this function are well known in the prior art. For example, the printer could be a 9-wire dot matrix print head capable of printing the sequence number at a specified location on the back of the check with up to 45 characters. It is emphasized that various operations and processing features may be excluded or included in the apparatus 10 without departing from the teachings of the invention. In other words, depending upon the particular application, some of the devices indicated in FIG. 2 may not be present in all versions of the apparatus and, on the other hand, additional devices or stations may be used within the apparatus 10 to perform some other desired functions.

After leaving the sequence number printing station 36, an endorsement stamp is placed upon the back of the check by the endorsement stamper 38. This device may be a conventional stamp and ink roller system which is activated by an electric solenoid to imprint the stamp on the back of the check. Next, the stamper 40 is used to stamp a "PAID" stamp on the front of the check, if so desired by the processing bank.

At this point, the gate or select blade 42 may be activated to route the checks along path 44 to the output portion of the apparatus. This would be done when it is desired to bypass the other portions and stations of the apparatus for a particular application, such as a high-speed reader-sorter. Assuming that this path is not taken, the checks progress around and through the back image scanner 46 which can be used to capture image data of the back of the check for storage in the memory system of the associated computer 12. Another alternate path is indicated by path 48 located between the printer station 36 and the exit opening 50. This path may be used when the deposit information is included on a register tape which is fed into the feed mechanism 26 and allowed to circulate through the stations 32, 34 and 36 before it is ejected through the opening 50. This versatility makes the apparatus 10 useful for processing both deposit tickets and deposit register tapes. When using register tapes, enhanced character recognition of the check amounts is possible by comparing the recognized amounts on the checks with the recognized amounts on the register tape to see if there is a match.

One of the purposes of the apparatus 10 is to inscribe data on the checks indicating certain data which has been displayed or read previously from the checks. For example, the monetary amount displayed or written on the check can be inscribed on the check with a magnetic ink so that subsequent processing of the check can directly ascertain the monetary amount of the check without having to consider the check drafter's method of indicating the monetary amount, either in handwriting or by various unpredictable forms of printing. To prevent the inscription of inaccurate data on the checks, the balancing of the check amounts with the deposit ticket amount is used, in this invention, to verify the accuracy of the entered currency amounts of the checks. When this balance has been proved it is safe to assume that the inscribed amount truly represents the amount for which the check was drawn. However, in order to inscribe the checks after the balance operation takes place, the currency amounts of all the checks must be entered as data before the balancing operation can be completed. The storage buffer 52 shown in FIG. 2 is used in the apparatus 10 to allow for this type of operation. By using the storage buffer, the amounts inscribed on the checks do not have to be changed because they have been verified by the balancing operation prior to inscribing on the checks. Thus, the chances of incorrectly inscribed checks are practically eliminated by the apparatus of this invention by the use of the document buffer. This increases productivity even though one normally thinks of a buffer as a holding mechanism which would slow the apparatus and reduce its productivity. In other words, by adding a holding or storage area for a group of checks, and preventing inscribing on the checks until the balance has been obtained, the throughput of the apparatus is increased irrespective of the temporary storage of the checks because corrections are not necessary and manual rehandling of the checks is not required.

The storage buffer 52 consists of a receptacle 54 having an input opening 56 and an output opening 58. The checks enter the opening 56 and move through the receptacle 54 until they butt against the stop 60. This aligns all of the edges of the documents together at one end of the group so that subsequent processing can be accomplished from a known reference point on the checks. The receptacle 54 is sized or dimensioned to accept a group of checks containing a plurality of individual checks. For example, the receptacle 54 may be sized to hold up to 250 checks in a single group. The microswitch 62 is used to indicate to the buffer controller 64 when the storage buffer 52 is full. This information is useful when the transport devices in the apparatus 10 operate at different speeds asynchronously with each other. For example, if the transport system leaving the buffer 52 runs slower than the system leading to the buffer 52, the switch 62 provides the information necessary to determine when it is possible for the controller 64 to run the transport leading into the buffer. In some cases, the buffer 52 may contain part of the checks of one group and part of the checks of another group being processed by the apparatus 10. For example, a group of checks may be in the process of being removed from the buffer 52 for further processing as a new group of checks associated with a new deposit ticket is being loaded into the buffer 52. Tracking in the controller 64, or the associated computer, could be used to determine when the last check of a particular group exits the buffer 52. The checks are held in the buffer 52 in the same sequence the data was entered, and they are removed on a first-in first-out basis. Lines 66 and 68 indicate the control of the buffer controller 64 over the transports leading to and from the storage buffer 52. It is emphasized that the buffer controller 64 may be a dedicated microprocessor system, or other electronic or mechanical device in the apparatus 10, or circuitry which is controlled by the associated computer. In other words, the functions of controlling the process flow in the apparatus 10 can be performed by its own controller system, the program contained in the associated computer, or a combination of the two.

After leaving the storage buffer 52, the face-down checks in the buffer are moved through the MICR device 70 which reads the data on the front of the check to verify that the check is the correct one to be inscribed at the next station. This sequence verification can be made in the associated computer system by making sure that the codeline read by the MICR device 70 matches the expected codeline stored in memory (previously read by MICR device 34) for the check to be inscribed. The checks are then routed or transported through the inscriber station 72 where the entered and balanced monetary data is inscribed on the front of the check at a predetermined position. The checks are then transported to the output stacker 20 where they are selectively deposited in an appropriate bin of the output stacker by the positioning of the gates or selector blades, such as gate 74. Functional control of the inscriber station and the output stacker 20 can be maintained by a dedicated circuit within the apparatus 10 or by output signals from the associated computer. This control can allow the output pockets to contain checks sorted for a particular reason, such as similarity of routing destination, payor banks, or account number similarities.

Figure 3:
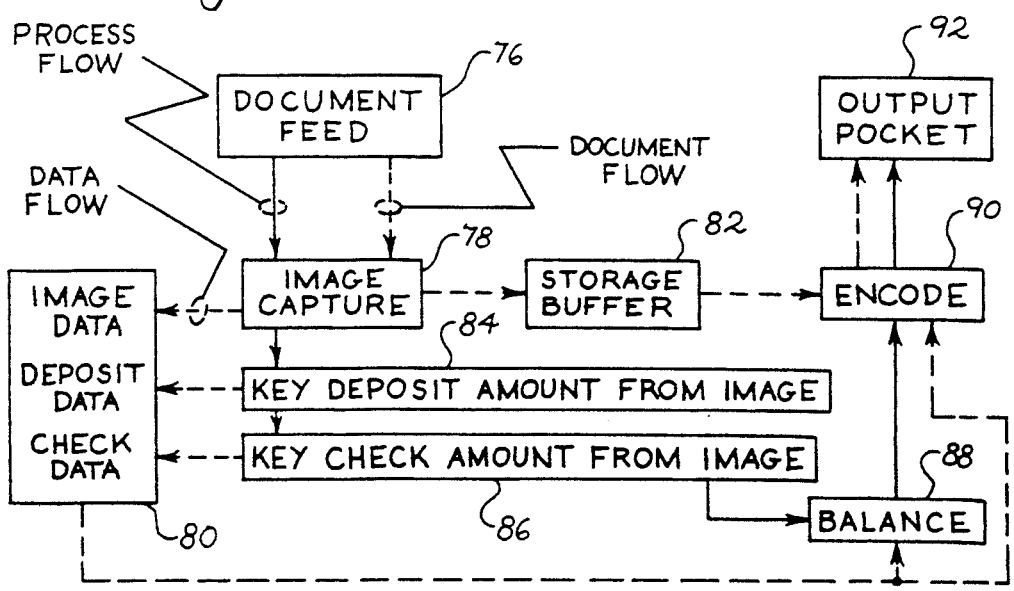
FIG. 3 is a block diagram representing various flow paths in the system.

FIG. 3 is a block diagram representing various flow paths in the system of this invention. According to FIG. 3, document feed starts at block 76 and transfers the documents to the image capture apparatus, indicated by block 78. Data from the image capture block 78 flows to the memory block 80, as indicated, where the image data is stored. Document flow continues to the storage buffer, indicated by block 82. Various operations occur while the checks are in the storage buffer 82. During this time, the process continues to block 84 where the deposit amount is keyed by the operator from the image captured in block 78. This information or data is also transferred to the memory 80. Process flow continues to block 86 where the amount of the check is keyed in by the operator from the image. This data is also transferred as check data to the memory 80.

The check and deposit data is used by the balance block 88 to determine if the amounts have been entered correctly and do, in fact, balance with each other. If such is the case, the amount data is transferred to the encode block 90 where the checks are inscribed with the monetary amounts. Once inscribed, or encoded, process and document flow continues to the output pocket 92 where the checks are collected for removal by the operator. If the checks did not balance properly with the deposit ticket, the operator could defeat the inscribing operation and output the checks and deposit ticket without printing an incorrect amount on some of the checks. Then, the operator could examine the checks and deposit ticket manually to determine where the error had been made and repeat the process with the correct data. As an alternative, and one which may provide more efficient operation, the operator could, after an imbalance condition is indicated, look at the images of the checks and deposit tickets/tapes and simultaneously display the amounts keyed for this group of documents while they are still contained in the storage buffer. This inspection should yield the incorrect entry, or entries, and allow for their correction and a resumption of the inscribing operation without having to handle the checks again. As soon as a deposit group has been balanced, the scanning and keying of the amounts for the next deposit group can be overlapped with the inscribing of the balanced groups.

Figure 4:
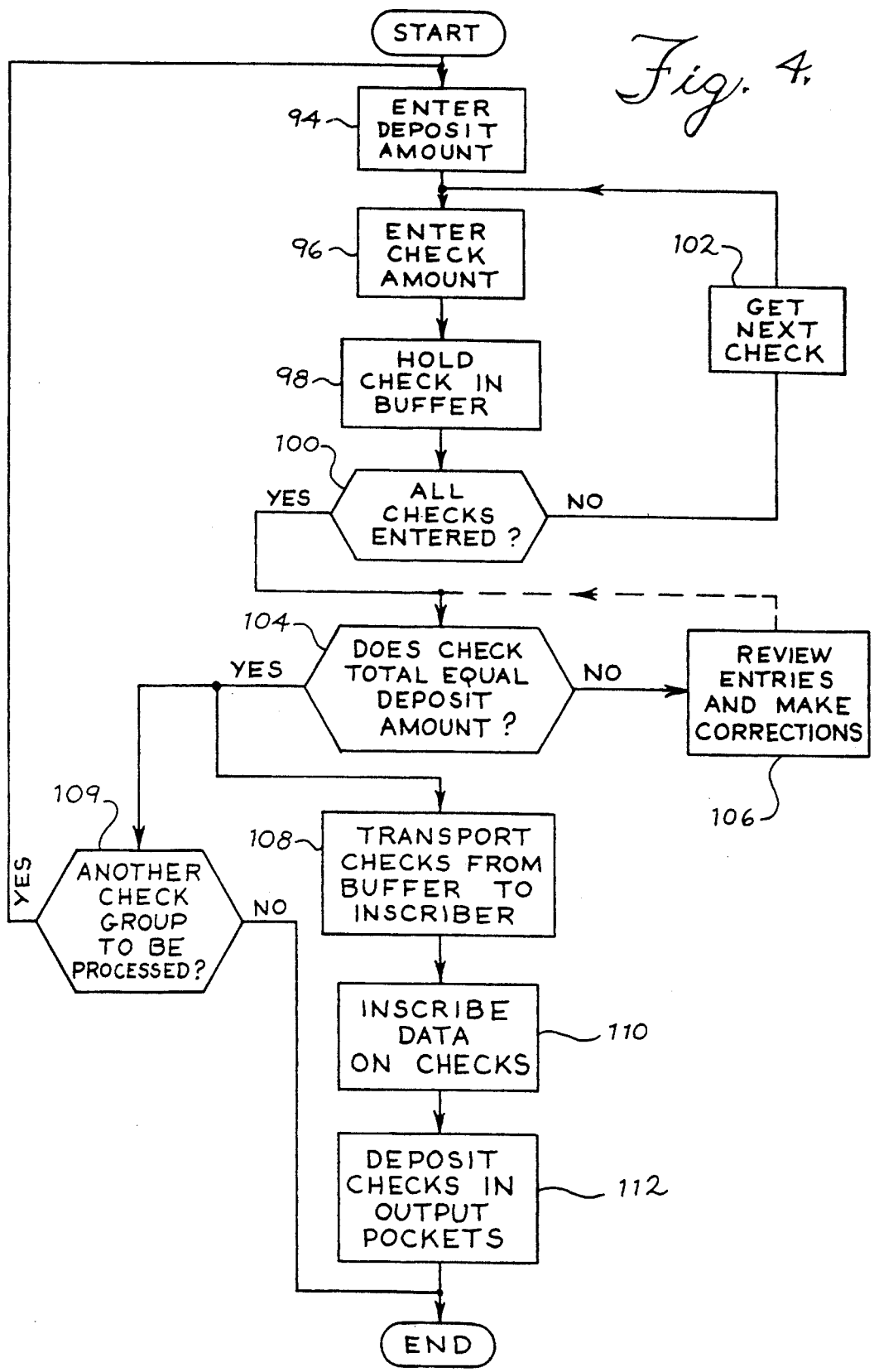
FIG. 4 is a flow diagram illustrating the overall operation of the document processing system.

FIG. 4 is a flow diagram illustrating the overall operation of the document processing system of this invention. First, the deposit amount of a deposit ticket is entered, either manually or by character recognition, as indicated in block 94. Next, the amount of a check is entered, as indicated in block 96, and the check is transferred to a holding buffer, as indicated in block 98. Process flow continues to block 100 where it is determined whether all of the checks of the deposit group have been entered. If the determination is that some checks remain to be entered, block 102 gets the next check and the entry process for the check amount is repeated. If it is determined that all of the checks for the group have been entered, the process flow is directed to block 104 where the balancing operation takes place. This determines whether the sum of the check amounts equals the deposit amount. If it does not, process flow is diverted to block 106 which indicates that the operator can make corrections and enter the balancing process again. If the checks do balance, the process flow is directed to blocks 108 and 109. At block 108, the checks are taken from the buffer and transferred to the inscriber. The inscriber inscribes the data on the checks as indicated in block 110 and the checks are then deposited in the output pockets as indicated in block 112. At the same time, block 109 determines if another check group is waiting to be processed and causes the data entering portion of the processing system to be working on a new check group while a previous group is being inscribed.

It is emphasized that numerous changes may be made in the above-described system without departing from the teachings of the invention. For example, the image capture may be made at another processing station rather than within the same apparatus enclosure as the inscribing station. In such case, the proofing and inscribing functions are carried out in the same apparatus using the previously captured image data. Instead of capturing images, the amounts may be keyed from directly viewing the documents in a suitable device, such as a hold and view station. Also, the buffer may be physically arranged to hold a complete group of checks before balancing in other than a vertical stack. It is intended that all of the matter contained in the foregoing description, or shown in the accompanying drawings, shall be interpreted as illustrative rather than limiting.

What is claimed is:

1. Apparatus for processing financial documents, said apparatus comprising:
   data entry means for entering data representing a monetary amount displayed on each of said documents;
   first document transporting means for individually transporting the financial documents through said data entry means;
   inscribing means for placing data on the individual documents which represents the monetary amount displayed on the document;
   storage means for holding a document group containing a plurality of said documents after they have been transported through the data entry means and before they are transported to the inscribing means;
   calculation means for processing the entered data to balance the monetary amounts in the document group; and
   second document transporting means for automatically and individually transporting the held documents in the storage means to the inscribing means after the document group has been balanced, thereby placing the data on the documents after the group of documents has been balanced.

2. The processing apparatus of claim 1 wherein the data entry is accomplished automatically, at least in part, by character recognition apparatus.

3. The processing apparatus of claim 1 wherein the data entry is accomplished manually, at least in part, by an operator keying-in amounts observed from viewing the actual document.

4. The processing apparatus of claim 1 wherein the data entry is accomplished manually, at least in part, by an operator keying-in amounts observed from viewing an image of the documents.

5. The processing apparatus of claim 1 wherein the apparatus also includes means for capturing and storing an image of the documents, and wherein the data entry is accomplished manually, at least in part, by an operator keying in amounts observed from viewing an image of the document previously captured by the apparatus.

6. The processing apparatus of claim 1 wherein the documents held in the storage means are arranged in the same sequence as the documents were transported through the data entry means.

7. The processing apparatus of claim 6 wherein the documents are removed from the storage means and transported by the second transport means to the inscribing means on a first-in first-out basis.

8. The processing apparatus of claim 1 including means for separately controlling the first and second transport means, and tracking means for separately tracking a first partial group of documents within the storage means consisting of documents some of which are still in the process of having their data entered, and for separately tracking a second partial document group consisting of documents some of which have already been inscribed by the apparatus.

9. The processing apparatus of claim 8 wherein the controlling and tracking means allows the storage means to also contain at least one complete document group consisting of documents all of which have had their data entered, and of documents none of which have been inscribed by the apparatus.

10. Apparatus for processing financial documents having a monetary amount indicated on each of said documents, said apparatus comprising:
    means for entering data corresponding to the monetary amount on each of said documents;
    inscribing means for placing data on the individual documents which represents the monetary amount entered for the document;
    storage means for holding a document group containing a plurality of said individual documents after their monetary amount data has been entered; p1 calculation means for processing the entered data to balance the monetary amounts in the document group; and
    means for automatically and individually transporting the held documents in the storage means to the inscribing means only after the document group has been balanced, thereby inscribing amount data on the individual documents only after the document group has been balanced.

11. The processing apparatus of claim 10 wherein the apparatus also includes means for capturing and storing an image of the documents, and wherein the data entry is accomplished manually, at least in part, by an operator keying in amounts observed from viewing the image of the document previously captured by the apparatus.

12. The processing apparatus of claim 10 wherein the documents held in the storage means are arranged in the same sequence as the documents were transported through the data entry means.

13. The processing apparatus of claim 12 wherein the documents are removed from the storage means and transported to the inscribing means on a first-in first-out basis.

14. A deposit ticket and check balancing and inscribing system, said system comprising:
    a computer terminal including a keyboard, display device, memory, processor unit, and a balancing program;
    a document transport system for transporting the ticket and checks through at least part of the balancing and inscribing system;
    means for capturing an image of each individual check and storing said images in said memory;
    means for displaying the captured images on said display device;
    means for acquiring data corresponding to the monetary amount indicated on the checks;
    means for storing all of the checks corresponding to the deposit ticket together as a group and in the same sequence as the images of the checks were previously captured;
    means for inscribing monetary amount data on the checks after they are removed from the storing means; and
    means for individually removing the checks from the storing means on a first-in first-out basis for delivery to the inscribing means;
    said removing means being automatically activated only after the balancing program has successfully balanced the checks with the deposit ticket, thereby inscribing the checks only after their amounts have been balanced with the deposit ticket.

15. The ticket and check balancing and inscribing system of claim 14 wherein the storage means includes means for segregating complete groups of checks and two different partial groups of checks existing in the storage means at the same time, thereby allowing the storage means to simultaneously contain checks from a group still in the process of having data entered for some of its checks, checks from a group in which some of its checks have already been inscribed, and checks from groups in which all of the checks have had their data entered but not inscribed.

16. The ticket and check balancing and inscribing system of claim 14 wherein the data is acquired manually, at least in part, by an operator keying in amounts observed from viewing an image of the checks on the computer terminal display.

17. The ticket and check balancing and inscribing system of claim 14 including a separate outlet path along which a deposit tape may be diverted after image capture.

18. A method of processing financial documents which have monetary amounts displayed thereon, said method including the steps of:
    individually routing the documents through a data entry station;
    entering data corresponding to a monetary amount displayed on the documents;
    holding the documents, as a group, in a storage area after the data for the group has been entered;
    balancing the entered data for the document group;
    automatically moving the documents, individually, from the storage area to an inscribing station after the data for the document group has been balanced according to a predetermined criteria; and
    inscribing monetary amount data on the individual documents at the inscribing station.

19. The method of document processing of claim 18 including the steps of capturing an image of the documents and processing the image to automatically recognize the monetary amounts displayed on the documents.

20. The method of document processing of claim 18 including the steps of capturing an image of the documents and manually keying-in the monetary amounts displayed on the documents from observing the captured images.

21. The method of document processing of claim 18 including the step of manually keying-in the monetary amounts displayed on the documents from directly observing the actual documents.

22. The method of document processing of claim 18 including the step of tracking the location of documents held in the storage area.

* * * * *